June 30, 1925.  
H. E. KREBS  
CULTIVATOR  
Filed July 24, 1923
1,544,094
2 Sheets-Sheet 2
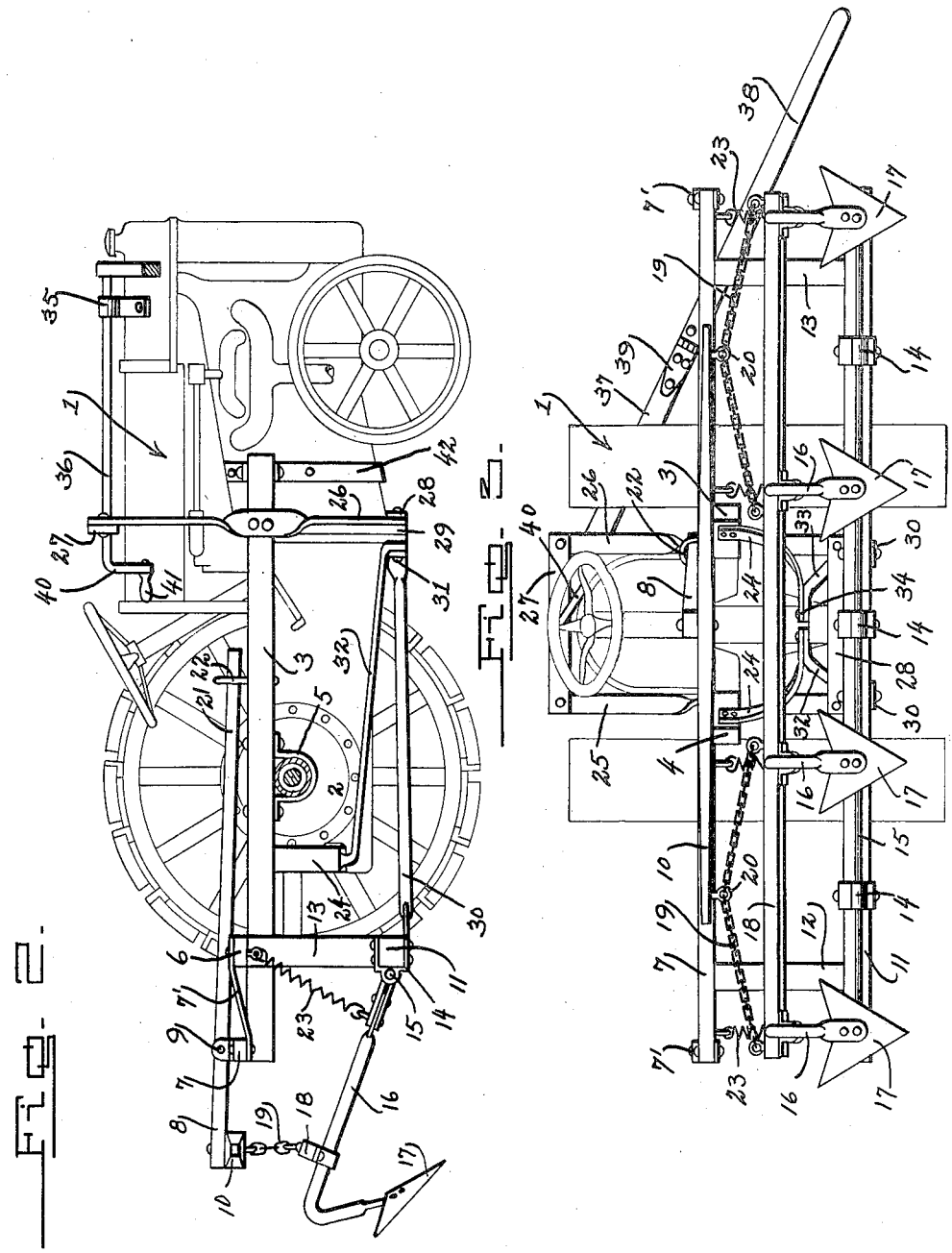
Inventor  
Hellmuth E. Krebs  
By Jacobi & Jacobi  
Attorneys Patented June 30, 1925.

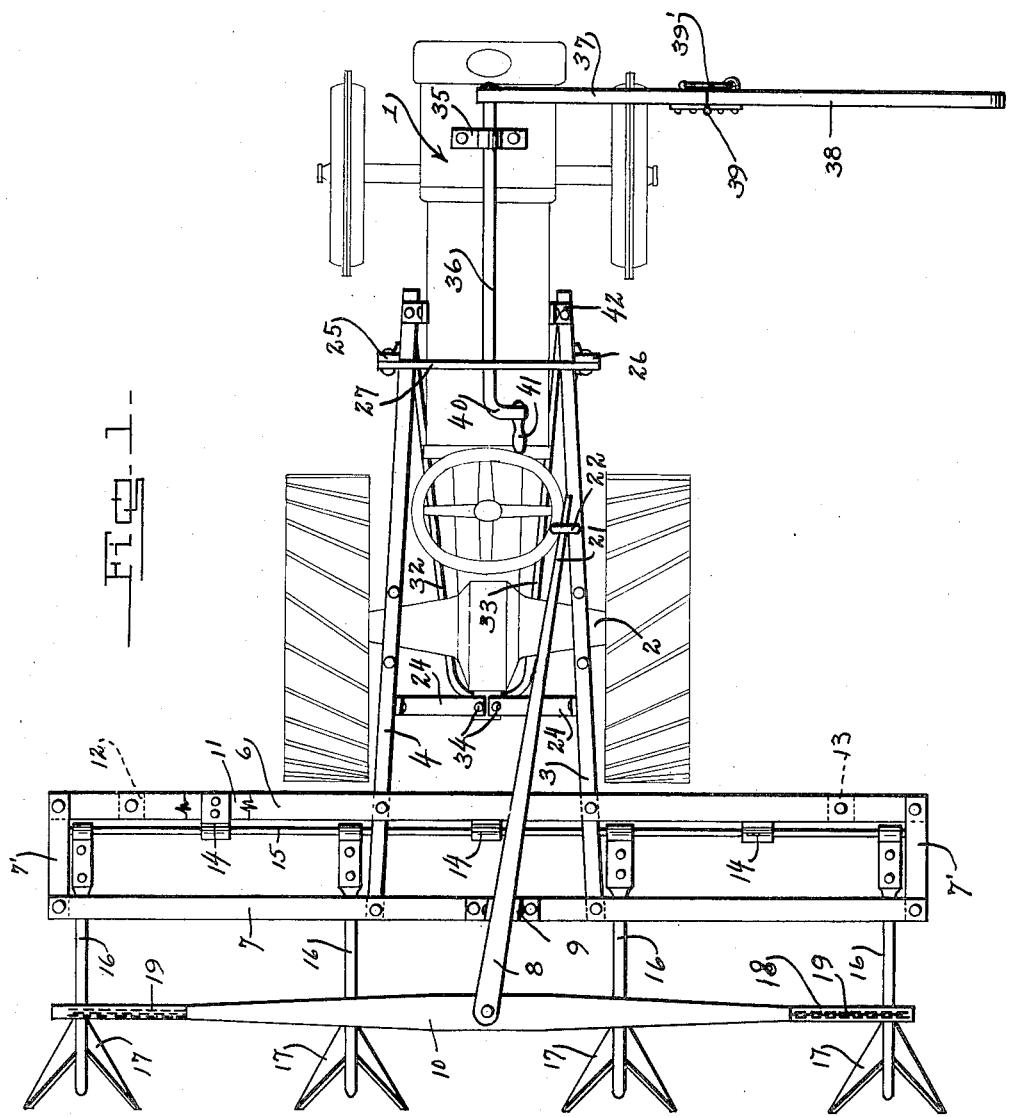

1,544,094

UNITED STATES PATENT OFFICE.

HELLMUTH E. KREBS, OF FAYETTEVILLE, TEXAS.

CULTIVATOR.

Application filed July 24, 1923. Serial No. 653,491.

*To all whom it may concern:*

Be it known that HELLMUTH E. KREBS, a citizen of the United States, residing at Fayetteville, in the county of Fayette and State of Texas, has invented certain new and useful Improvements in Cultivators, of which the following is a specification.

This invention relates to a cultivator and has for its principal object to provide a device which is especially adapted for use in connection with a Fordson tractor and which is furthermore adapted to be used in cultivating four rows at a time.

Another important object of the invention is to provide a four row cultivator attachment of the above mentioned character, which is provided with means for raising the plows into an inoperative position and out of engagement with the ground and furthermore enable the plows to automatically be raised out of the ground when the same meet with an obstruction while in use.

A further object of the invention is to provide a four row cultivator attachment of the above mentioned character, wherein the same may be easily and quickly supported in position upon a Fordson tractor and will not alter the construction of the tractor or prevent the operation of the same when in use.

A still further object of the invention is to provide a four row cultivator attachment wherein the means for controlling the plows is in a position which is readily accessible to the driver of the tractor without the necessity of the driver having to leave his seat while the cultivator is in operation, for the purpose of raising or lowering the plows into an operative or an inoperative position.

Another important object of the invention is to provide a four row cultivator attachment of the above mentioned character, which is associated or provided with guide means mounted on the forward portion of the tractor for enabling the operator to readily gauge the path of travel of the tractor and cultivator while in use.

A further object of the invention is to provide a cultivator attachment of the above mentioned character, which is simple in construction, inexpensive, strong, durable and further well adapted for the purposes for which it is designed.

Other objects and advantages of this invention will become apparent during the course of the following description.

In the accompanying drawings forming a part of this specification and in which like numerals designate like parts throughout the same:—

Figure 1 is a top plan view of a Fordson tractor showing my invention applied thereon.

Figure 2 is a side elevation thereof, and

Figure 3 is a rear elevation thereof.

In the drawings wherein for the purpose of illustration is shown the preferred embodiment of my invention, the numeral 1 designates a Fordson tractor which is of the usual construction and well known in the art and upon which is adapted to be mounted my cultivator attachment. The rear axle housing 2 of the tractor is adapted to provide a means for supporting the longitudinally extending beams 3 and 4 respectively, each beam being clamped around the axle housing 2 intermediate its ends and supported on the axle housing by means of the clamp 5.

Extending transversely across the outer free ends of the longitudinally extending beams 3 and 4 and within close proximity to the rear tractor wheels of the tractor is the transversely extending bar 6. Spaced from the transverse bar 6 and also extending across the ends of the longitudinal beams 3 and 4 is a second transverse bar 7. Suitable spacing bars 7' are adapted to extend between the respective ends of the transverse bars 6 and 7 in the manner as more clearly shown in Fig. 1 of the drawings. The transverse bars 6 and 7 may be mounted on the outwardly extending ends of the longitudinal beams 3 and 4 in any suitable manner and I do not wish to confine myself to the particular manner in which they are mounted on or secured thereto.

The purpose of this second transverse bar 7 is to provide a means for pivotally supporting the lever 8 adjacent the shorter end thereof and at a point designated by the numeral 9 in the drawings. The shorter arm of this lever 8 being connected to the transverse extending beam 10 which extends in spaced relation to the transverse bars 6 and 7 and is carried by the short arm of the lever 8 intermediate its ends and for the purpose to be hereinafter more fully described.

A transverse bar 11 is adapted to be supported in spaced relation with the transverse bar 6 by means of the vertical supports 12 and 13. The lower transverse bar 11 is in substantially the same plane with the upper transverse bar 6. Carried by the transverse bar 11 are the journals 14 and which are adapted to receive and support the axle 15.

Pivotally supported on the axle 15 which is journaled in the members 14 carried by the transverse bar 11 are the plow beams 16. The plow beams are provided with curved rear portions which terminate or are secured at their lower free ends to the plows 17. A suitable connecting rod 18 is adapted to extend transversely across the several plow beams 16 whereby the plow beams are held in proper alignment and in spaced relation to each other in order that the plows may be held in proper position when in use.

Extending between the plow beams 16 and preferably arranged so as to extend between the outer and inner plow beams are the chains 19. The purpose of these chains is to provide a means whereby the transverse beam 10 may be connected to the intermediate portion of the chains as shown at 20 in the drawings. In order that the plow beams 16 and the plows 17 carried thereby may be raised out of engagement with the ground, I provide a hook 22 on the longitudinal beam 3 and the purpose of this hook is to engage the forward portion 21 of the lever 8 which extends forwardly within access to the driver of the tractor so that when the forward portion 21 of the lever is held by the hook 22 the plow beams and plows carried thereby will be out of engagement with the ground. It is to be understood, however, that when in use the lever 8 has its forward portion 21 disengaged from the hook 22 and the weight of the plow beams and plows will normally cause the latter to be held in an operative position. Whenever it is desired to raise the plows into an inoperative position, the operator or driver of the tractor merely moves the forward portion 21 of the lever 8 downwardly whereby the plow beams will swing upon the axle and accordingly raise the plows 17 upwardly and out of engagement with the ground.

Suitable coil springs 23 are provided and are preferably fastened at one end to the pivotal connection of each plow beam with the axle 15 and the opposite end of the coil springs are secured to the transverse bar 6 in the manner as clearly shown in Fig. 2 of the drawings. The purpose of these springs 26 being to normally assist in raising the plows 17 into an inoperative position if the same should strike an obstruction while in use, hence preventing injury to the plows as is now frequently experienced. As is further shown in Fig. 3 of the drawings each plow beam is adapted to be provided with a coil of the character above described.

Suitable brace rods 24 are adapted to extend between the longitudinally extending beams 3 and 4 to further aid in supporting the same and the transverse bar 10 at the rear portion thereof are held in proper position. Extending upwardly from the longitudinal beams 3 and 4 adjacent the forward ends thereof are the vertical standards 25 and 26 and these standards may be secured intermediate their ends upon the sides of the vertical standards in any suitable manner. Extending across the upper ends of the vertical standards 25 and 26 is a transverse member 27. A corresponding transverse member 28 is associated with the lower ends of the vertical standards and this member 28 abuts the flange 29 provided on the transmission casing of the tractor. Connecting the lower transverse bar 11 to the tractor is the longitudinally extending draw bars 30. The forward ends of the draw bars 30 are secured to the flange 29 by means of the bolt 31. Complementary auxiliary braces 32 and 33 extend around the axle housing 2 of the tractor and are secured thereto as shown at 34, the forward ends of these braces being also connected to the flange 29 by the bolt 31.

A transverse bracket 35 is mounted on the top of the forward portion of the tractor 1 as shown in Figs. 1 and 2 of the drawings and adapted to extend longitudinally between the transverse members 27 and 35 is the tracer rod 36. The forward end of this tracer rod 36 extends beyond and through the bracket 35 and is connected to a laterally extending tracer 37 which extends beyond the sides of the tractor 1 and is of such a construction as to have its outer end 38 hingedly supported as shown at 39 and held in proper position upon the main portion of the tracer 37 by means of suitable fastening means such as is shown at 39' in the drawings. The purpose of the tracer rod and tracer is to provide a means for enabling the operator of the tractor to gauge the proper distance from the last furrow formed thereby enabling the tractor and cultivator carried thereby to be guided in proper spaced relation to the last furrow made. Furthermore the tracer rod and tracer is adapted to be swung to either side of the tractor as the case necessitates.

For the purpose of permitting the tracer 36 to be swung into an operative or inoperative position, I provide an extension 40 on the inner end of the tracer rod 37 and this extension 40 is provided with a suitable operating handle 41 whereby the same is directly forward of the driver of the tractor and within convenient reach of him. This enables the operator to swing the tracer 37 upwardly into an inoperative position. Additional brace elements 42 extend across the forward end of the longitudinal beams 3 and 4 for further reinforcing the same, and it will be thus seen from the foregoing description that the control of the cultivator including the plow beams and plows carried thereby as well as the tracer are within easy reach of the operator of the tractor and does not necessitate the operator having to leave his seat in order to control each independent part.

With a cultivator attachment of the above mentioned character, especially one adapted for use in connection with the cultivation of four rows at one time, the plows may be simultaneously lifted out of the ground when it is desired to move the tractor from place to place when not in use and furthermore this feature may be controlled in a simple and efficient manner and which will be manually actuated. The tracer will also be actuated by the operator thereby doing away with the necessity of having to employ several complicated parts in conjunction with the operation of the several essential features of the invention and which would ordinarily require the employment of a person skilled in the handling of complicated machinery in order to properly operate the tractor and the cultivator associated therewith.

The cultivator attachment is also of such a construction as to insure the proper operation of the plows when the tractor is moving along the ground by providing springs therefor and permit of the raising of the plows from the ground but enabling the same to be readily disengaged therefrom when coming in contact with any obstruction.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to, without departing from the spirit or sacrificing any of the principles of the invention.

What I claim as new and desire to secure by Letters Patent is:—

The combination with a tractor; of a frame comprising a pair of longitudinally extending bars connected to the axle housing of the tractor intermediate their ends, a transverse bar extending across the outer ends of said longitudinal bars, a second transverse bar suspended from and below the first mentioned transverse bar, plow beams hingedly connected to the last mentioned transverse bar and extending rearwardly thereof, plows on the outer ends of said beams, a third transverse bar supported at the rear ends of said longitudinal bars, means for raising and lowering said plow beams comprising a lever fulcrumed intermediate of its ends centrally of the third transverse bar, a transverse beam pivotally connected to the rear end of said lever and arranged in a plane above said beams, a spacing and connecting bar engaged with said plow beams, and pairs of downwardly divergent flexible connections engaged with the transverse beam at their one ends and with said connecting and spacing bar at their opposite ends, a hook member carried on one of the longitudinal bars of the frame adapted for engagement with the forward free end of said lever to retain the beams in raised position, and coil springs connecting the plow beams with the first mentioned transverse bar, as and for the purpose described.

In testimony whereof I affix my signature.

HELLMUTH E. KREBS.